July 28, 1964  R. D. HULL  3,142,454
SPINNING REEL WITH LINE BRAKE
Filed May 4, 1961  2 Sheets-Sheet 1

INVENTOR
R. DELL HULL

BY
Mandeville & Schweitzer
ATTORNEYS

July 28, 1964
R. D. HULL
3,142,454
SPINNING REEL WITH LINE BRAKE
Filed May 4, 1961
2 Sheets-Sheet 2
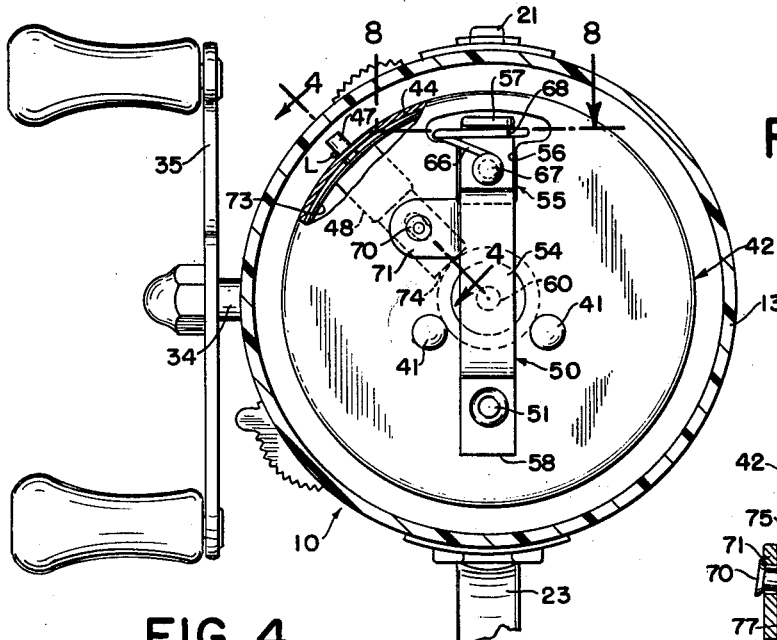
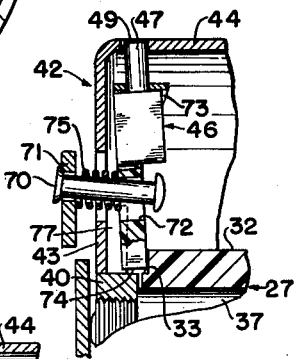
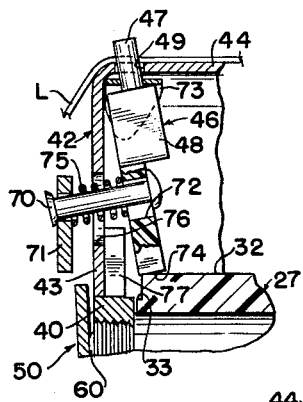
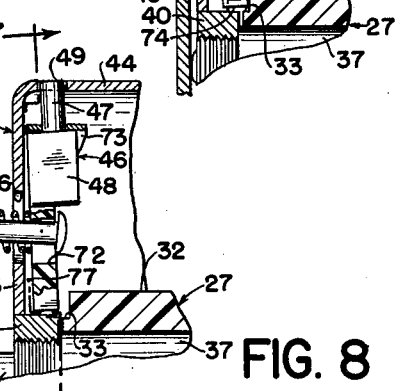
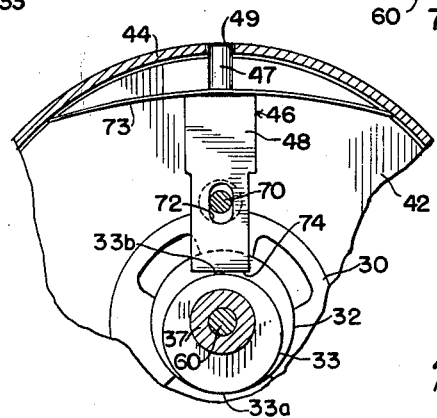
INVENTOR
R. DELL HULL
BY
Mandeville & Schweitzer
ATTORNEYS United States Patent Office 3,142,454
Patented July 28, 1964

3,142,454
SPINNING REEL WITH LINE BRAKE
R. Dell Hull, 1131 E. Easton St., P.O. Box 270,
Tulsa, Okla.
Filed May 4, 1961, Ser. No. 107,816
10 Claims. (Cl. 242—84.2)

The present invention relates to fishing reels, generally and is directed more specifically to improvements in spinning reels, particularly of the closed-face type.

One of the advantageous forms of spinning reels is the so-called closed-face spinning reel, in which a line spool and wind-up mechanism are housed in a casing and substantially completely enclosed. The front wall of the casing is provided with a central opening, through which the fishing line is passed in casting, retrieving, etc. In certain improved forms of closed-face spinning reels, an annular line spool is non-rotatably mounted on the reel frame, and a pick-up head is mounted for rotation about the line spool. The pick-up head carries or is associated with a retractable pick-up pin, for engaging the line during rewinding or retrieving, and with brake means for controlling outward movement of the line. In addition, certain of the reels of prior construction incorporate a so-called feather brake, which affords delicate control over the outflow of line during casting.

In accordance with the present invention, a novel and improved closed-face spinning reel is provided, which is characterized particularly by specifically improved brake and feather brake means, as well as specifically improved arrangements for controlling the operation of the pick-up pin. In this respect, the invention is further directed to the provision of an improved closed-face spinning reel, having brake means, feather brake means and pick-up pin means, in which a novel and improved interaction is established between the beforementioned elements, affording substantial simplification in the construction and operation of the reel.

In accordance with one of the more specific aspects of the invention, an improved brake means is provided for a closed-face spinning reel, which brake means is extremely simplified, with respect to its manufacture and assembly, and which is particularly durable and reliable in operation. In addition, the improved brake means permits an extremely simplified arrangement for the provision of feather brake means adapted to be actuated by the same manual control element used for actuation of the principal brake element.

In accordance with another specific aspect of the invention, a significantly simplified arrangement is provided for controlling the actuation of a pick-up pin member in a closed-face spinning reel. In this respect, the mechanism of the invention includes a rotating pick-up head which is generally non-movable in axial directions and which carries a pick-up pin element projectable through an opening in the rim of the pick-up head. The inner end of pick-up pin element is mounted for controlled movement in an axial direction, whereby the inner end of the element may be moved into and out of operative relationship with a cam surface used for projecting the pick-up pin through the rim of the head. Heretofore, somewhat similar arrangements have been provided for actuating the pick-up pin element. However, such prior arrangements have involved axial movement of the pick-up head itself, which is avoided in the structure of the present invention. This enables significant economies to be realized in the manufacture of the reel, and also renders the reel mechanism more durable and reliable in operation.

In accordance with a further specific aspect of the invention, a novel and improved arrangement is provided for actuating the pick-up pin element of a closed-face spinning reel, substantially in accordance with the foregoing paragraph, but further characterized by the fact that actuation of the pick-up element is effected through movement of the brake member into line braking position. This advantageous construction provides a particularly simplified, and therefore economical and reliable, operating mechanism, and provides a closed-face spinning reel of a generally superior nature.

For a better understanding of the above and other advantageous features of the invention, reference should be made to the following detailed description and to the accompanying drawing, in which:

FIG. 3 is a cross-sectional view taken generally along line 3—3 of FIG. 1;

FIG. 4 is an enlarged, fragmentary cross-sectional view taken generally along line 4—4 of FIG. 3;

FIGS. 5 and 6 are fragmentary cross-sectional views similar to FIG. 4, illustrating the mechanism in different operating conditions;

FIG. 7 is a fragmentary cross-sectional view taken generally along line 7—7 of FIG. 5; and FIG. 8 is a fragmentary cross-sectional view taken generally along line 8—8 of FIG. 3.

Figure 1:
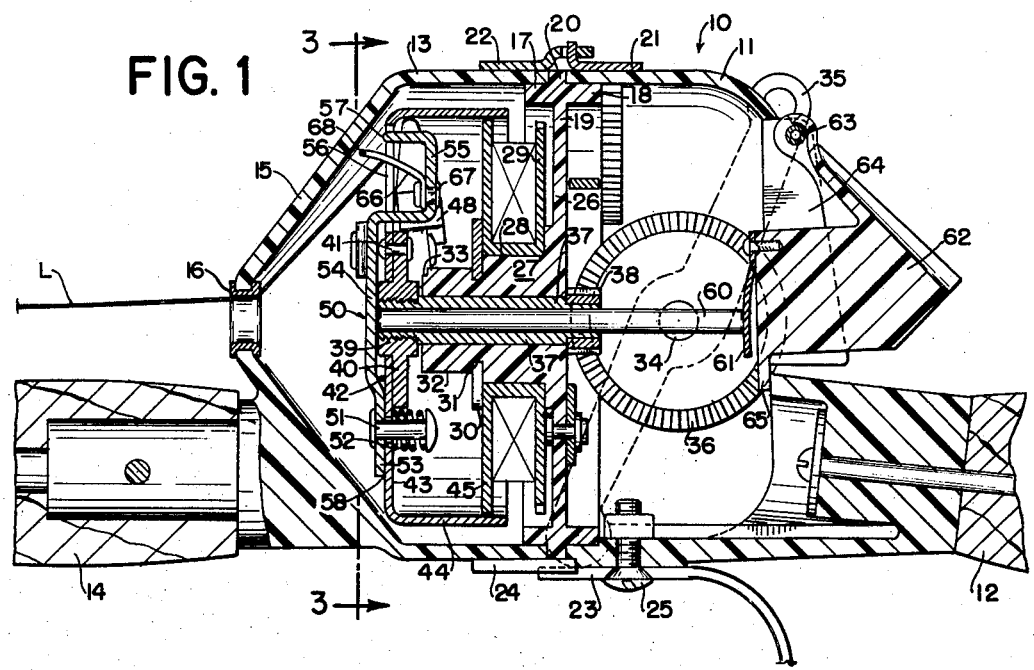
FIG. 1 is a longitudinal cross-sectional view of a closed-face spinning reel incorporating the features of the invention.

Referring now to the drawing, and initially to FIG. 1 thereof, the reference numeral 10 designates generally a reel casing, which advantageously forms part of a rod, reel and handle combination, generally similar to that described and claimed in my co-pending application Ser. No. 755,540, filed August 18, 1958, now Patent No. 3,020,666, for example. Thus, the casing includes a back casing member 11 affixed to a handle 12 and a front casing member 13 affixed to a rod 14. The front casing member 13 has a generally conical front wall 15 provided with a central opening 16 for the passage of a fishing line L. The casing members 11, 13 advantageously are cylindrical in form and the open end sections of the casing parts are adapted to be received closely about cylindrical flanges 17, 18 of a reel frame 19.

Between the cylindrical flanges 17, 18 of the reel frame there is provided a radially projecting annular flange 20 forming oppositely facing abutment surfaces. As indicated in FIG. 1, in the assembled reel combination, the casing parts 11, 13 are received over the flanges 17, 18 and brought into abutting relation with the radial flange 20. This advantageous structural arrangement serves to mount the reel frame 19 properly in the housing, with the cylindrical flanges 17, 18 positioning the casing parts 11, 13 in proper axial alignment and with the radial flange 20 forming an active part of the rod-reel handle combination structure.

The entire combination assembly, as above described, is held together by interlocking, cylindrical hinge lugs 21, 22, at the top of the respective casing parts 11, 13, and interlocking elements 23, 24 at the bottom of the respective casing parts. As described and claimed in my co-pending application Ser. No. 35,353, filed June 10, 1960, now Patent No. 3,020,665, the locking element 24 may be fixed to casing part 13, while the locking element 23, which may also constitute a finger grip element, is releasably secured to the casing part 11 by means of a screw 25. The arrangement is such that, when initial assembly of the combination is effected through proper engagement of the separable lugs 21, 22, the members 23, 24 are interengaged and then secured in locked relation by tightening the screw 25.

As shown best in FIG. 1, the reel frame 19 includes a transverse wall 26 and an integral, forwardly projecting central boss 27. The boss 27 is formed to provide a cylindrical hub 28, which mounts a line spool 29. The spool 29 is secured in place by a snap ring 30, received in an annular groove 31 in the boss. A cylindrical supporting surface 32 concentric with the principal axis of the reel is formed by the boss 27, forward of the line spool, and a cam 33, which may be cylindrical but is eccentric with respect to the reel axis, is formed at the forward extremity of the boss.

In the illustrated reel mechanism, the reel frame 19 advantageously includes an integral bearing block (not specifically shown) which journals a winding shaft 34. In the assembled reel combination, the winding shaft projects outward from the casing part 11 and also into its interior, and a winding handle 35 is mounted on the projecting outer end, while a face gear 36 is mounted on the inner end of the shaft. A tubular drive shaft 37 is journaled directly by the boss 27 of the reel frame and has portions projecting both forward and rearward therefrom. The rearward end of the drive shaft 37 has formed thereon a pinion 38, which meshes with the face gear 36, and the forward end of the shaft is threaded, as at 39, to secure a flanged disc 40. Secured to the disc 40, by rivets 41 or other means, is a pick-up head 42, comprising a transverse front wall portion 43 and a cylindrical wall 44, which advantageously projects rearwardly beyond the front flange 45 of the line spool.

In accordance with the invention, the pick-up head 42 is fixed to the tubular drive shaft 37, in the assembled reel, such that substantially no axial movement of the pick-up head is accommodated. The pick-up head is, however, rotatable with the drive shaft 37, in accordance with rotations of the winding handle 35.

As will be described in greater detail, the reel assembly of the invention includes improved line pick-up arrangements formed in part by a line pick-up element 46, comprising a pick-up pin 47, and a body member 48. The pick-up pin 47 is projectable through an opening 49 in the cylindrical outer wall of the pick-up head, and is arranged, when so projected, to be revolved with the pick-up head in the clearance space between the cylindrical wall 44 and the surrounding wall of the front casing part 13. As indicated in FIGS. 4 and 5, for example, the pick-up element 46 has two principal operating positions, one in which the pick-up pin 47 projects radially outward from the wall 44 of the pick-up head, and another in which the pick-up pin 47 is retracted, substantially to a position flush with the outer surface of the wall 44. In accordance with known general practice, the pick-up pin 47 is moved to its projected position for line retrieval, whereby the line L will be picked up during rotation of the pick-up head 42 and caused to be wound about the line spool 29. During the cast, the pick-up pin 47 is in its retracted position, permitting the line to revolve freely about the pick-up head 42 as the line is payed out from the spool.

After retrieving the line, and in preparation for a subsequent cast, it is necessary to retract the pick-up pin 47 and also, at the same time, to brake the line, to prevent its outflow prior to the exact instant desired by the caster. In accordance with the present invention, a novel and improved arrangement is provided for substantially simultaneously retracting the pick-up pin and braking the line against outflow. To this end, the new reel incorporates a brake arm 50, which is mounted on the front face of the pick-up head 42 and is disposed generally transversely with respect thereto. The brake arm 50 is secured at one end to the front face of the pick-up head 42 by means of a pin 51, which extends through the brake arm and pick-up head and is urged in an axially rearward direction by means of a spring 52 acting against the inner face of the pick-up head and against the rear head of the pin 51. Advantageously, the brake arm 50 includes a flat portion extending radially on both sides of the pin 51, so that the brake arm 50 has a stable position substantially flat against the front face of the pick-up head.

Figure 2:
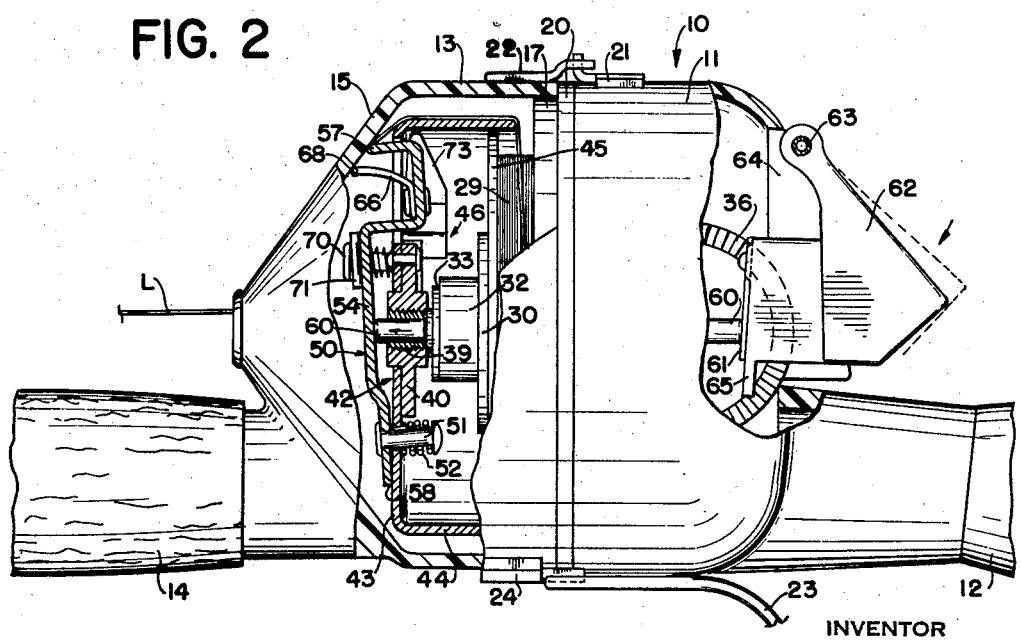
FIG. 2 is an elevational view of the reel of FIG. 1, with parts broken away to illustrate the reel mechanism in an operating condition different from FIG. 1.

As shown in FIG. 1, the brake arm 50 has an intermediate portion 54 which passes over the center of the pick-up head and joins with a hook-like end portion 55. Advantageously, the hook-like end portion 55 of the brake arm projects rearward through an opening 56 in the front face of the pick-up head for a predetermined distance, such that the upper end of the brake arm (as viewed in FIG. 1, for example) is guided and confined by the sides of the opening 56 in any operative position of the brake arm. The extreme outer end 57 of the brake arm, which makes the actual braking engagement with the line L, is positioned near the outer wall 44 of the pick-up head. Normally, the braking element 57 is substantially fully recessed within the pick-up head 42, as indicated in FIG. 1. However, in accordance with the invention, the brake arm is adapted to be projected forward, in a manner causing the arm to pivot about its lower edge 58, so that the braking element 57 is moved into contact with the front wall 15 of the reel casing part 13, substantially as indicated in FIG. 2. When the braking element 57 is in its thus indicated operative position, the revolving payout of the line is blocked by the brake element, and no line will pass from the reel, unless substantial tension is applied to the line to cause the line spool 29 to turn on its hub 28.

Advantageously, the brake element 57 has its end surface 59 disposed at an angle with respect to the front face of the pick-up head 42, as indicated in FIG. 8, such that the line, tending to revolve in the direction of the arrow in FIG. 8 during payout, will reliably free itself from the brake element 57 when the brake arm 50 is released from its active position, shown in FIG. 2, to its retracted position shown in FIG. 1.

Actuation of the brake arm 50 is effected by means of a control rod 60, received slidably within the tubular drive shaft 37 and having its forward end bearing against the intermediate portion 54 of the brake arm. A portion of the control rod extends toward the rear of the back casing part 11 and bears against a leaf spring element 61 carried by a thumb control element 62 pivoted at 63 on the casing part 11. In the illustrated form of the invention, the thumb control lever 62, advantageously made out of a structural plastic material, similar to that used in the making of the casing parts 11, 13 and the reel frame 19, is received in an opening 64 in the back of the casing part 11 and has a flange 65 projecting downward below the lower edge of the opening, to limit outward pivotal movement of the lever. The leaf spring 61 and control rod 62 are so related that, in the assembled reel combination, the control rod 60 deflects the leaf spring rearward a slight amount, to urge the control lever 62 to its rearwardmost position without, however, reacting in the forward direction sufficiently to propect the brake arm 50 in a forward direction.

To render the main brake effective, the operator depresses the thumb lever 62 to drive the control rod 60 forward. This causes the brake arm 50 to pivot about its edge 58, pressing the spring 52, substantially as indicated in FIG. 2. Upon release of the thumb lever 62, the spring 52 returns the brake arm 50 to its normal position, flat against the front face of the pick-up head, driving the control rod 60 rearward and returning the thumb lever 62 to its normal position.

In accordance with one of the specific aspects of the invention, the reel includes a simplified and improved form of feather brake, in the form of a spring wire 66 anchored by a rivet 68 to the base of the hook-like portion 55 of the brake arm. As best shown in FIGS. 3 and 8, the spring wire element 66 has an angular front section 68, which projects through an enlarged outer portion of the pick-up head opening 56, and the free end 69 of the spring wire element advantageously extends rearward, to lie behind the front face of the pick-up head 42 in any operative position.

As indicated in FIGS. 1 and 8, the angled front element 68 of the spring wire 66 normally extends well in front of the angled front edge 59 of the brake element 57. Accordingly, when the brake arm 50 is actuated by depression of the thumb lever 62 to a position intermediate those shown in FIGS. 1 and 2, the spring wire element 66 will be advanced to a position in which tte front section 68 thereof intercepts the revolving line L during its payout. The line, revolving in the direction of the arrow in FIG. 8, engages and is deflected forward by the front section 68 of the spring wire element, and extremely delicate control over the outflow of line is made possible by causing the line to pass between the front wall 15 of the casing and the spring wire element 68. In this respect, the element 68 may be urged against the casing wall 15 with varying force, by appropriate manipulation of the thumb lever 62, so that the spring wire is deflected with more or less difficulty by the line during its revolving payout.

As will be understood, the spring wire 66 is sufficiently deflectable that, upon full actuation of the thumb lever 62, the main line braking element 57 can be brought into forcible contact with the casing wall 15 for positive braking action.

In accordance with another significant aspect of the invention, novel and improved mechanical arrangements are provided for actuating the pick-up element 46 into its various operative positions. As shown best in FIG. 7, the pick-up element 46 is guided for generally radial movement in the pick-up head, by means of the pin 47 which is received and is slidably guided in the opening 49 in the pick-up head wall 44, and by a control pin 70 loosely received at one end in a lateral extension 71 of the brake arm and loosely and slidably received at its other end in a radial slot 72 in the pick-up element body 48. A leaf spring 73 bears radially inward against the pick-up element 46, the ends of the spring extending from each side of the pick-up element and engaging the cylindrical wall 44 of the pick-up head.

At its radially inward end, the body 48 of the pick-up element has an abutment surface 74 arranged for alternative cooperation with the concentric cylindrical surfact 32 on the central boss of the reel frame and the cam surface 33 on the forward extremity of the boss. As shown best in FIG. 7, the cam 33 advantageously is in the form of a cylindrical surface located in eccentric relation to the principal axis of the reel and having one surface extremity 33a flush with the concentric cylindrical surface 32 and a second surface extremity 33b which is sufficiently close to the axis of the reel to clear the inner end 74 of the pick-up element when the latter is in its retracted position.

The pick-up element 46 is held in a projected position against the action of the leaf spring 73 by means of the concentric cylindrical surface 32, which supports the lower end 74 of the pick-up element, substantially as indicated in FIG. 4. The pick-up element is held in the position shown in FIG. 4 by means of a spring 75, which acts between the brake arm extension 71 and the pick-up body 48, the spring 75 being positioned around the control pin 70 and, along with the pin, passing through the front face of the pick-up head through an opening 76. In accordance with the invention, the length of the control pin 70, is such that, when the brake arm 50 is in its normal, flat position, the lower end of the pick-up body is urged by the spring to a position rearward of the front edge of the concentric cylindrical surface 32. Thus, in all rotary positions of the pick-up head 42, the pick-up element is supported in its projected position by the concentric cylindrical surface.

When the brake arm 50 is projected forward, by manipulation of the thumb lever 62, the brake arm extension 71 draws the control pin 70 forward, pulling the lower end of the pick-up body 48 off of the concentric cylindrical surface 32, and even forward of the cam surface 33. When thus drawn forward, as shown in FIG. 5, the lower end of the pick-up body is received in a notch 77 in the flanged collar 40, and the bottom of the notch serves to limit the radially inward or retracting movement of the pick-up element, such that, in its innermost position, the abutment surface 74 clears the inner surface extremity 33b of the cam, substantially in the manner indicated in FIG. 7. With the pick-up element in this position, the pin 47 is fully retracted, to a position at least flush with the outer surface of the pick-up head, so that the line may revolve freely during payout.

Following retraction of the pick-up element by forward movement of the brake arm, as indicated in FIG. 5, the thumb lever 62 can be released, allowing the brake arm and its lateral extension 71 to return to their normal position. However, the lower end of the pick-up element engages the front surface of the boss 27 and is held against further rearward movement as shown in FIG. 6. This causes the spring 75 to be compressed between the pick-up body 48 and the brake arm extension 71 (the spring 75 having less effective movement of the brake arm than its main return spring 52). The control pin 70, being loosely received in the brake arm extension 71 and in the pick-up body 48, accommodates the necessary closing movement of the extension 71 toward the pick-up body to compress the spring 75 in the manner described.

When the pick-up head 42 is rotated, with the pick-up element 46 in its retracted position, the pick-up body 48 is brought, within one revolution of the pick-up head, to a rotary position in which abutment surface 74 is aligned with the innermost surface extremity 33b of the cam. At this point, the spring 75 moves the lower end of the pick-up body in rearward direction, so that the abutment surface 74 then overlies the cam surface (FIG. 6). Further rotation of the pick-up head for one-half revolution will carry the abutment surface 74 around to a point where it directly overlies the outer surface extremity 33a of the cam and at this point the spring 75 urges the lower end of the pick-up body 48 further to the rear, onto the concentric cylindrical surface 32. Thereafter, the pick-up element remains supported in its projected position by the surface 32 and substantially as indicated in FIG. 4.

In describing the operation of the new reel, it will be assumed that a line retrieving operation has just been completed, by effecting rotation of the pick-up head 42, with its pick-up pin 47 extended. In preparation for a cast, the thumb control lever 62 is fully depressed, which advances the control rod 60 and projects the brake element 57 into firm contact with the front surface 15 for positively braking the line L against normal, revolving payout. At the same time, forward movement of the brake arm 50 causes the inner end of the pick-up element 46 to be drawn forward, off its cylindrical supporting surface 32, causing the pick-up element to be moved by the leaf spring 73 into its retracted position, substantially as indicated in FIGS. 5–7. With the reel thus conditioned and the control lever 62 maintained depressed, the operator is ready to commence a cast.

A cast is effected by the usual whipping motion of the rod, with the thumb control lever 62 being released by the operator in a carefully timed manner, whereby the brake arm 50 is released and returned by its spring 52 to a flat position and revolving payout of the line is commenced.

During the cast, the operator may exert a delicate decelerating control over the outflow of line, by partially depressing the thumb control lever 62. By this means, the brake arm 50 is pivoted forward a distance insufficient to render the main brake element 57 effective, but sufficient to project the spring wire 66 into or substantially into contact with the front wall 15 of the casing, so that the line L is intercepted during its revolutions. However, the resilient character and strength of the spring wire 66 is such that the wire can be deflected by the revolving line, so that energy of the cast is controllably dissipated. Substantial control over the length of the cast is thus provided, as will be understood, by controlling the amount of pressure applied to the thumb control lever 62 to in turn control the extent of compression of the spring element 66 and the energy expended as the line deflects and passes the spring element during each revolution.

To stop the cast, the operator depresses the thumb control lever 62 fully, to advance the main brake element 57 into contact with the front wall 15 of the casing for positive prevention of further rotation of the line.

Line retrieval is effected by simply rotating the winding handle 35 in the proper direction. During the first rotation of the pick-up head, the abutment surface 74 of the pick-up element will be urged into a position overlying the cam 33 and, during the subsequent one-half revolution of the pick-up head, the pick-up element will be urged to its radially projected position by the eccentric surface of the cam. Once fully projected, the lower end of the pick-up element is urged to the rear, over the concentric cylindrical surface 32, which supports the pick-up element in projected position during the remainder of the winding operation, during which the line is coiled about the spool 29.

Advantageously, the reel includes auxiliary controls, such as click means, anti-reverse means and drag brake means and, for further details of such auxiliary mechanisms, reference may be made to my co-pending applications Ser. No. 788,813, filed January 26, 1959, now Patent No. 2,991,957, Ser. No. 788,814, filed January 26, 1959, now Patent No. 3,050,271, and Ser. No. 45,129, filed July 25, 1960, now Patent No. 3,088,691, for example.

The reel of the present invention incorporates several novel and improved features of structure and mechanism in respect of its feather brake and main brake elements and in respect of the arrangements provided for controlling and actuating the pick-up pin. The new reel is of particularly simplified construction, lending itself desirably to economical mass manufacture, and providing particular reliability and durability, which is of paramount importance in a mechanism of the nature herein concerned, which is apt to be handled carelessly and operated and serviced by technically unskilled persons.

It should be understood, however, that the specific form of the invention herein illustrated and described is intended to be representative only, as certain changes may be made therein without departing from the teachings of the disclosure. Accordingly, reference should be made to the following appended claims in determining the full scope of the invention.

I claim:

1. A closed face spinning reel comprising a reel frame, a rotatable shaft, means supporting said shaft for rotation within said frame, a pick-up head fixed to said shaft for rotation therewith, a reel casing generally surrounding the frame and pick-up head and having a front wall forward of the pick-up head, a substantially rigid brake arm having a rigid, positive line braking element, a pin connecting said brake arm to the front wall of the pick-up head, said pin being loosely received in at least one of the members connected thereby and being of greater length than the combined thickness of the connected members, and a spring acting on the connecting pin and one of the connected members to resiliently retain the connected members in predetermined relation, said spring normally urging said brake arm to the front face of the pick-up head while accommodating limited pivotal movement of the rigid line braking element of said brake arm away from said pick-up head.

2. A closed face spinning reel comprising a reel frame, a rotatable shaft, means supporting said shaft for rotation within said frame, a pick-up head fixed to said shaft for rotation therewith, a reel casing generally surrounding the frame and pick-up head and having a front wall forward of the pick-up head, a substantially rigid brake arm having a rigid, positive line braking element, said brake arm being mounted in offset relation to the center of the pick-up head and extending across the center of the pick-up head, means resiliently mounting and normally urging said brake arm to the front face of the pick-up head while accommodating limited pivotal movement of the rigid line braking element of said brake arm away from said pick-up head, and control means including a control rod movable axially in said reel frame and projectable forward through the center of the pick-up head to deflect the brake arm forward relative to said pick-up head.

3. A closed face spinning reel comprising a reel frame, a rotatable shaft, means supporting said shaft for rotation within said frame, a pick-up head fixed to said shaft for rotation therewith, a reel casing generally surrounding the frame and pick-up head and having a front wall forward of the pick-up head, a substantially rigid brake arm having a rigid, positive line braking element, said brake arm having a hook-like free end section, said pick-up head defining an opening therein, said hook-like section being received in said opening and extending rearwardly of the front wall of said pick-up head, said line braking element comprising a forwardly projecting portion of the hook-like section, a spring wire element mounted on said hook-like section at a point behind the front wall of the pick-up head, the spring wire element having a rearwardly deflectable portion normally projecting forward of the line braking element, the spring wire element being movable into contact with the front wall of the casing in advance of the line braking element and being deflectable by the line during revolving payout, and spring means resiliently mounting and normally urging said brake arm to the front face of the pick-up head while accommodating limited pivotal movement of the rigid line braking element away from said pick-up head.

4. The reel of claim 3 in which said hook-like section projects behind the front wall of the pick-up head a distance greater than the maximum forward deflecting movement of the brake arm.

5. A closed face spinning reel comprising a reel frame, a rotatable shaft, means supporting said shaft for rotation within said frame, a pick-up head fixed to said shaft for rotation therewith, a reel casing generally surrounding the frame and pick-up head and having a front wall forward of the pick-up head, a substantially rigid brake arm having a rigid, positive line braking element, means resiliently mounting and normally urging said brake arm to the front face of the pick-up head while the accommodating limited pivotal movement of the rigid line braking element of said brake arm away from said pick-up head, a pick-up element mounted on the pick-up head and having a portion projectable into a line engaging position beyond the periphery of the pick-up head, spring means urging the pick-up element toward a retracted position, cylindrical support means on the reel frame concentric with the axis of rotation of the pick-up head, said pick-up head being in fixed axial relation to said cylindrical support means and having its front wall spaced forward therefrom, abutment means on the pick-up element adapted for cooperative engagement with said cylindrical support means to maintain the projectable portion of said pick-up element in line engaging position, and a control pin loosely connecting the pick-up element and the brake arm and being operative upon forward deflection of the brake arm relative to the pick-up head to move said abutment means forward off said cylindrical support.

6. The reel of claim 5 which includes a control spring urging said abutment means in a rearward direction, cam means forward of said cylindrical support, said cam means including a surface extremity flush with said cylindrical support, said control spring being operative to urge said abutment means rearward onto said cam means and cylindrical support.

7. The reel of claim 6 in which said control spring acts between said abutment means and said brake arm.

8. A closed face spinning reel comprising a reel frame, a rotatable shaft, means supporting said shaft for rotation within said frame, a pick-up head fixed to said shaft for rotation therewith, said pick-up head including a cylindrical outer wall, a reel casing generally surrounding the frame and pick-up head and having a front wall forward of the pick-up head, a substantially rigid brake arm having a rigid, positive line braking element, means resiliently mounting and normally urging said brake arm to the front face of the pick-up head while accommodating limited pivotal movement of the rigid line braking element of said brake arm away from said pick-up head, a pick-up element mounted on the pick-up head and having a body portion and a portion projectable into a line engaging position beyond the periphery of the pick-up head, said projectable portion being received in and guided by an opening in the cylindrical wall of the pick-up head, spring means urging the pick-up element toward a retracted position, cylindrical support means on the reel frame concentric with the axis of rotation of the pick-up head, said pick-up head being in fixed axial relation to said cylindrical support means and having its front wall spaced forward therefrom, abutment means on the pick-up element adapted for cooperative engagement with said cylindrical support means to maintain the projectable portion of said pick-up element in line engaging position, said abutment means being formed on said body portion and having an abutment surface for cooperation with said cylindrical support means, and guide means for said body portion accommodating radial movements thereof and forward and rearward movements off of and onto said cylindrical support means, said pick-up element being retracted by movement of its abutment means forward off said support means by said rigid brake arm.

9. A closed face spinning reel comprising a reel frame, a pick-up head mounted on the frame for rotation about a predetermined axis, a cylindrical support surface projecting forward from the reel frame in concentric relation to said axis and having a forward end spaced behind said pick-up head, said pick-up head and said cylindrical support surface being in fixed axial relation, a pick-up element carried by said pick-up head and having a portion projectable beyond the periphery of the pick-up head, first spring means urging the pick-up element radially in one direction, cam means for moving the pick-up element radially in the other direction and into supported relation to said cylindrical supporting surface, a control plate carried by said pick-up head and disposed in an inactive position substantially parallel with the front face of said pick-up head, said plate being forwardly axially movable away from said pick-up head into an active position, a two-headed axially disposed control pin being spaced in a radial direction from said predetermined axis and loosely connecting said pick-up element and said control plate, and a second spring means concentric with said control pin and urging said pick-up element axially rearward, said control plate being adapted to draw said control pin forward to move the pick-up element off the cylindrical supporting surface, said second spring means being adapted to urge said pickup element onto said cam means when said control plate is in said inactive position.

10. A closed face spinning reel comprising a reel frame, a rotatable shaft, means supporting said shaft for rotation within said frame, a pick-up head fixed to said shaft for rotation therewith, a reel casing generally surrounding the frame and pick-up head and having a front wall forward of the pick-up head, a substantially rigid brake arm pivotally mounted on the front surface of the pick-up head and having a rigid line braking element, said pick-up head being provided with an opening adjacent said brake arm, a first portion of said brake arm extending rearwardly into said opening and a second portion extending forwardly out of said opening, said second portion comprising said rigid line braking element, and spring means resiliently mounting and normally urging said brake arm to the front face of the pick-up head while accommodating limited pivotal movement of the rigid line braking element of said brake arm away from said pick-up head.

References Cited in the file of this patent

UNITED STATES PATENTS

| | | |
|---|---|---|
| 2,668,025 | Hull | Feb. 2, 1954 |
| 2,843,333 | Jones | July 15, 1958 |
| 2,911,165 | Sarah | Nov. 3, 1959 |
| 3,032,290 | Wallace | May 1, 1962 |
| 3,034,741 | Macy et al. | May 15, 1962 |
| 3,054,571 | Most | Sept. 18, 1962 |

FOREIGN PATENTS

| | | |
|---|---|---|
| 588,742 | Canada | Dec. 2, 1959 |
| 610,752 | Canada | Dec. 20, 1960 |